(12) United States Patent
Tatem (10) Patent No.: US 10,306,076 B2
(45) Date of Patent: May 28, 2019

(54) TRIPLEXER SIGNAL COMBINER

(71) Applicant: THE DIRECTV GROUP, INC., El Segundo, CA (US)

(72) Inventor: Richard Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 166 days.

(21) Appl. No.: 15/236,927

(22) Filed: Aug. 15, 2016

(65) Prior Publication Data

US 2018/0048438 A1 Feb. 15, 2018

(51) Int. Cl.
| H04N 21/61 | (2011.01) |
| H04M 19/08 | (2006.01) |
| H04L 12/28 | (2006.01) |
| H04L 12/40 | (2006.01) |

(52) U.S. Cl.
CPC ............ *H04M 19/08* (2013.01); *H04L 12/28* (2013.01); *H04N 21/61* (2013.01); *H04L 12/40* (2013.01)

(58) Field of Classification Search
None
See application file for complete search history.

(56) References Cited

U.S. PATENT DOCUMENTS

| 5,784,683 | A | 7/1998 | Sistanizadeh et al. |
| 5,917,624 | A | 6/1999 | Wagner et al. |
| 6,144,399 | A | 11/2000 | Manchester et al. |
| 6,871,081 | B1 | 3/2005 | Llewellyn |
| 7,007,296 | B2 | 2/2006 | Rakib |
| 7,486,742 | B2 | 2/2009 | Santhoff et al. |
| 8,086,261 | B2 | 12/2011 | Radpour |
| 8,160,507 | B2 | 4/2012 | Lorg et al. |
| 8,350,889 | B1 | 1/2013 | Shammoh |
| 8,381,250 | B2 | 2/2013 | Tjio et al. |
| 9,042,492 | B2 | 5/2015 | Kolze et al. |
| 9,065,965 | B2 | 6/2015 | Krein et al. |
| 2002/0178454 | A1 | 11/2002 | Antoine et al. |
| 2007/0116097 | A1 | 5/2007 | Santhoff et al. |
| 2007/0223429 | A1 | 9/2007 | Akgun et al. |

(Continued)

FOREIGN PATENT DOCUMENTS

| CA | 2880267 | 1/2014 |
| CN | 103117764 A | 5/2013 |

(Continued)

OTHER PUBLICATIONS

Feldman, Daniel, 2014_05_G.FAST_Summit_Reverse_Powering_Its_Benefits_and_Constraints, www.microsemi.com, 2014.*

(Continued)

*Primary Examiner* — Kent K Krueger
(74) *Attorney, Agent, or Firm* — Guntin & Gust, PLC; Mark Wilinski (57) ABSTRACT

Aspects of the subject disclosure may include, for example, apparatus that includes a first port that receives a radio frequency signal input, a second port that provides a high-speed Internet connection and the radio frequency signal input and receives a power supply current, and a third port that receives the high-speed Internet connection and receives the power supply current and that the first port is isolated from the power supply current. Other embodiments are disclosed.

20 Claims, 5 Drawing Sheets

(56) References Cited

U.S. PATENT DOCUMENTS

2015/0135252 A1* 5/2015 Muterspaugh ......... H03H 7/466
　　　　　　　　　　　　　　　　　　　　　　　725/149
2016/0079665 A1 3/2016 Norin et al.

FOREIGN PATENT DOCUMENTS

| CN | 103780282 A | 5/2014 |
|---|---|---|
| JP | 2004526354 A | 8/2004 |
| WO | 2015143054 | 9/2015 |

OTHER PUBLICATIONS

Sonora Design Associates, MoCA E Band Diplexers, www.sonoradesign.com, May 12, 2015.*
"B(ridge) and T(unnel) Crowd", "Can You Run OTA Antenna TV and Internet Feeds on the Same Coax Cable? Yes!", bandtcrowdblogspot.com, Feb. 23, 2013.
"CWave MDU (Multi Dwelling Unit) Broadband Solutions", pulselink.com, Oct. 7, 2014.
"G.fast", AlcatelLucent, alcatellucent.com, Mar. 24, 2016.
"MultiDwelling Unit Fiber Deployment", Suttle, ospmag.com, Mar. 2009.
Emmendorfer, Michael, "Next Generation Networks for Multiple Dwelling Units (MDU)", arris.com, 2014.

\* cited by examiner

TRIPLEXER SIGNAL COMBINER

FIELD OF THE DISCLOSURE

The subject disclosure relates to device(s) that perform combining and splitting of radio frequency signals.

BACKGROUND

Previously, diplexer devices were able to combine and split signals, such as a satellite signal and another non-satellite signal, via a common wire.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a triplexer device that can combine and split two signals on a line while being able to block a third signal. Other embodiments are described in the subject disclosure. Exemplarily, this allows a direct current voltage signal to be provided from one device to another device in addition to combining and splitting two different signals. In some embodiments, the direct current voltage signal can be used to provide a battery back-up to voice-over Internet protocol services without expensive battery back-up equipment.

One or more aspects of the subject disclosure include an apparatus that includes a first port that receives a radio frequency signal input, a second port that provides a high-speed Internet connection and the radio frequency signal input and receives a power supply current, and a third port that receives the high-speed Internet connection and receives the power supply current and that the first port is isolated from the power supply current.

One or more aspects of the subject disclosure include system that includes an input to a single living unit premise from a multi-premise intermediate distribution frame comprising a direct current power supply, a satellite radio frequency signal, and a broadband Internet connection and a triplexer configured to receive the input from the multi-premise intermediate distribution frame and to provide the direct current power supply to the multi-premise intermediate distribution frame and to divide the input into a first output comprising the satellite radio frequency signal and a second output comprising the broadband Internet connection and to receive a first input of the direct current power supply.

One or more aspects of the subject disclosure include a system that includes a multi-premise intermediate distribution frame comprising a satellite signal receiver that provides a satellite radio frequency signal and a broadband Internet device that provides an Internet connection and an intermediate distribution frame triplexer configured to receive the satellite radio frequency signal and the Internet connection from the multi-premise intermediate distribution frame and to provide a direct current power supply signal to the broadband Internet device, wherein the triplexer combines the satellite radio frequency signal and the Internet connection into a coaxial cable signal while receiving the direct current power supply signal from the coaxial cable signal, and wherein the coaxial cable signal is connected to an intermediate distribution frame coaxial cable outlet.

Exemplarily, different radio frequency (RF) signals are required to coexist in common coaxial cables to provide services to multiple devices of a user. In satellite communications, diplexers have been used to combine and to split satellite RF signals received from a satellite dish and other non-satellite RF signals. Exemplarily, the diplexer should be able combine and split the various RF signals according to preferred performance parameters.

Exemplary embodiments of the present invention include the ability to combine and split satellite and non-satellite RF signals as well as to block a third, or additional, RF signal. Exemplary embodiments can be perform a combining and splitting of a satellite signal and an alternative RF signal such as G.Fast, G.hn, cable modem services or UHF/VHF Off-air signals, while blocking a third mid-band RF Multimedia over Coaxial (MoCa) signal that operates in a 400 to 700 MHz band.

Figure 1:
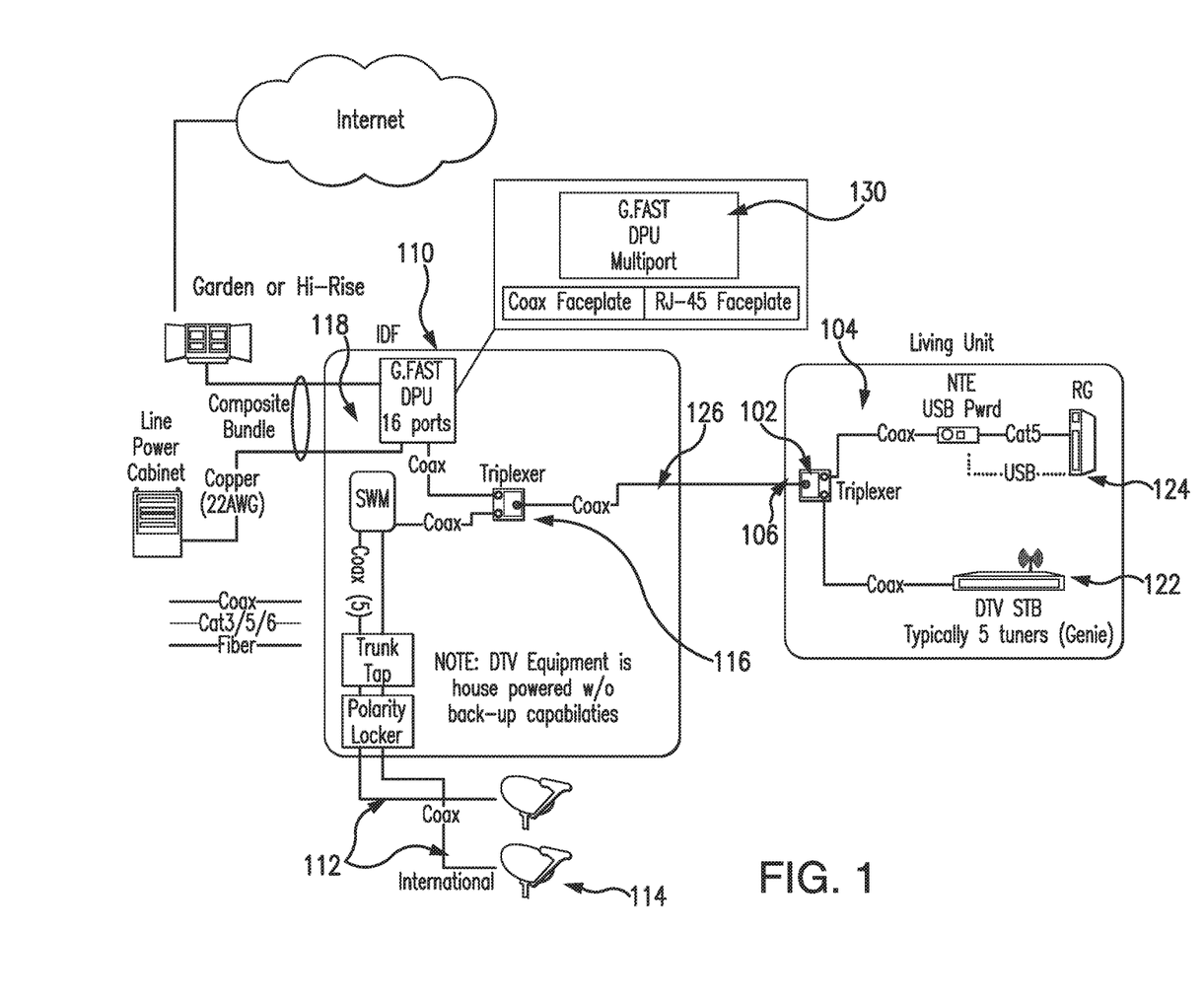
FIG. 1 depicts an illustrative embodiment of environment 100.

FIG. 1 depicts an illustrative embodiment of environment 100 in which exemplary embodiments of the invention may be practiced. Exemplary embodiments of triplexers 102 and 116 are provided in a multi-dwelling unit environment, such as a Hi-Rise or Garden style apartment complex, in which individual units, such as living unit 104, are provided with only a single coaxial cable input 106. A triplexer 102 can be provided in the living unit 104 to receive the coaxial output from intermediate distribution frame (IDF) 110. The output from triplexer 102 can be divided into a satellite signal feed for a media processor 122 and a high speed Internet feed for a router unit 124.

Living unit 104 exemplarily includes the media processor 122. The media processor 122 can include a set-top box portion and a digital video recorder portion. Exemplarily, the media processor can receive satellite RF signals via a coaxial cable and provide media content to a connected display device. In addition, living unit 104 can include a router unit 124 that provides broadband Internet signals to devices in and around the living unit 104. Exemplarily, router unit 124 receives electrical power from an outlet within the living unit 104. In other embodiments, router unit 124 can be a cable modem or other broadband device that provides access to the Internet.

IDF 110 can exemplarily receive satellite RF signals 112 from one or more satellite dishes 114. IDF 110 exemplarily receives high speed internet service, such as G.FAST 118 service. The inputs received by IDF 110 can be combined at triplexer 116 into a coaxial cable signal 120 that is provided to single coaxial cable input 106 of living unit 104. A G.Fast Distribution Point Unit (DPU) 130 can be provided in the IDF 110. G.Fast DPU Exemplarily, the G.Fast DPU 130 can receive power from the router unit 124 via a coaxial cable 126 through the triplexers 102 and 116.

Exemplarily, the power that the G.Fast DPU 130 receives is a direct current (DC) signal. Exemplarily, the DC signal is a DC voltage/current signal that can power the G.Fast DPU 130 that is connected to the G.Fast port of the Triplexer 116. This is exemplarily a reverse line power that can provide electrical power to the G.Fast DPU 130 device that is located in a data closet via a power supply device of the router 124 that may be located in the living unit 104. In some instances, the G.Fast DPU 130 is installed in a data closet (or on the external side of an MDU building or Townhouse) that does not have access to AC power (e.g. No convenient 110V AC power outlet). In other embodiments, the G.Fast DPU 130 can be provided with AC power and uses the DC signal in pace of a battery back-up.

Exemplarily the DC signal is provided by a customer provided power supply unit that is located inside the customer's apartment. The home-run coaxial cable that connects the customer's apartment to the IDF 110 where the G.Fast DPU 130 is located can be used to deliver the DC voltage/current required to power the G.Fast DPU 130 as well as to deliver the satellite signal and the broadband internet service. Exemplarily, the end customer powers their internet connection to alleviate the need for a costly battery back-up equipment in the Data closet to power the G.Fast DPU 130. In some embodiments, the G.Fast DPU 130 can receive a DC signal from each living unit it supplies Internet service to. In some embodiments, the G.Fast DPU 130 can have sixteen ports to provide service to 16 different living units. A DC signal from any one of the sixteen living units can provide power to the G.Fast DPU 130 in an event of a power failure.

Exemplary embodiments can support multi-dwelling unit (MDU) and Commercial installations where video services are delivered via an RF Satellite signal to customers who are served via a signal coaxial cable for their respective dwelling or living unit in a building with multiple units. In many cases, the MDU or Commercial property wiring plant does not allow for the installation of a 2nd or additional coaxial cables to service individual dwelling units. Most of the individual units are provided with only a single coaxial cable to serve their needs.

Therefore, all services to be provided to a customer must "peacefully co-exist" over a signal coaxial cable. The age and quality of the coaxial cable must also be taken into consideration when designing an RF service. The variety of services include the delivery of entertainment video services such as satellite television signals, high speed broadband Internet services such as G.Fast, G.hn, Cable Modem Termination Service (CMTS), Home Phoneline Networking Alliance over Coax cable (HNPA/HCNA), and Multimedia over Coax Alliance (MoCA), as well as digital voice, NTSC, ATSC, and related Off-Air video channels, as well as closed circuit video services.

Exemplary embodiments of the triplexer should be fully compliant to all required performance parameters, including, but not limited to in-band and out of band RF emissions, insertion loss, return loss, port to port isolation loss, gain flatness and Total Harmonic distortion. Additionally, exemplary embodiments should support signal wire multi-switch (SWM) services at 2.3 MHz and 950-2150 MHz. Other requirements will exemplarily include support and compliance for ITU-T G.Fast Services as per ITU-T G.9700 specifications including the ability to pass very low frequency "Fax" tones used for G.Fast start-up and service handshake in the range of 30 KHz to 430 KHz.

Other exemplary requirements include the preferred ability to allow G.Fast service to operate from 5 MHz to 212 MHz In some embodiments, the ITU-T standard for G.Fast service allows for operation from 2 MHz to 212 MHz while satellite SWM FSK carriers can operate at 2.1 MHz to 2.4 MHz with a center frequency of 2.3 Mhz. Exemplarily embodiments provide a sharp high order filtering and image rejection such that the satellite SWM service at 2.1 MHz-2.4 MHz operates without interference from outside RF sources while allowing G.Fast service to operate from 5 MHz to 212 MHz without interference from outside RF sources. In some embodiments, only the lower 3 MHz of bandwidth are lost when operating G.Fast service on a common coaxial wire with Satellite service.

Additionally, embodiments of the invention provide support for DC reverse voltage line power to enable the MDU or Dwelling unit to power the G.Fast device located in the building data communication closet. The reverse line power requirement includes support for 60V DC at 500 mAmps, support for built-in MoCA Band-stop filter (Triplexer device) providing better than 65 dB of rejection at the MoCA band, and support for diplexing in a variety of other "non-satellite" services such as Mid-Band RF MoCA, Off-Air UHF/UHV video signals, and Cable Modem Termination Systems (CMTS) with no performance impact to the satellite service. Exemplarily embodiments must comply with all RF requirements over temperature (−32 C to +65 C) and under max voltage and current load.

Figure 2:
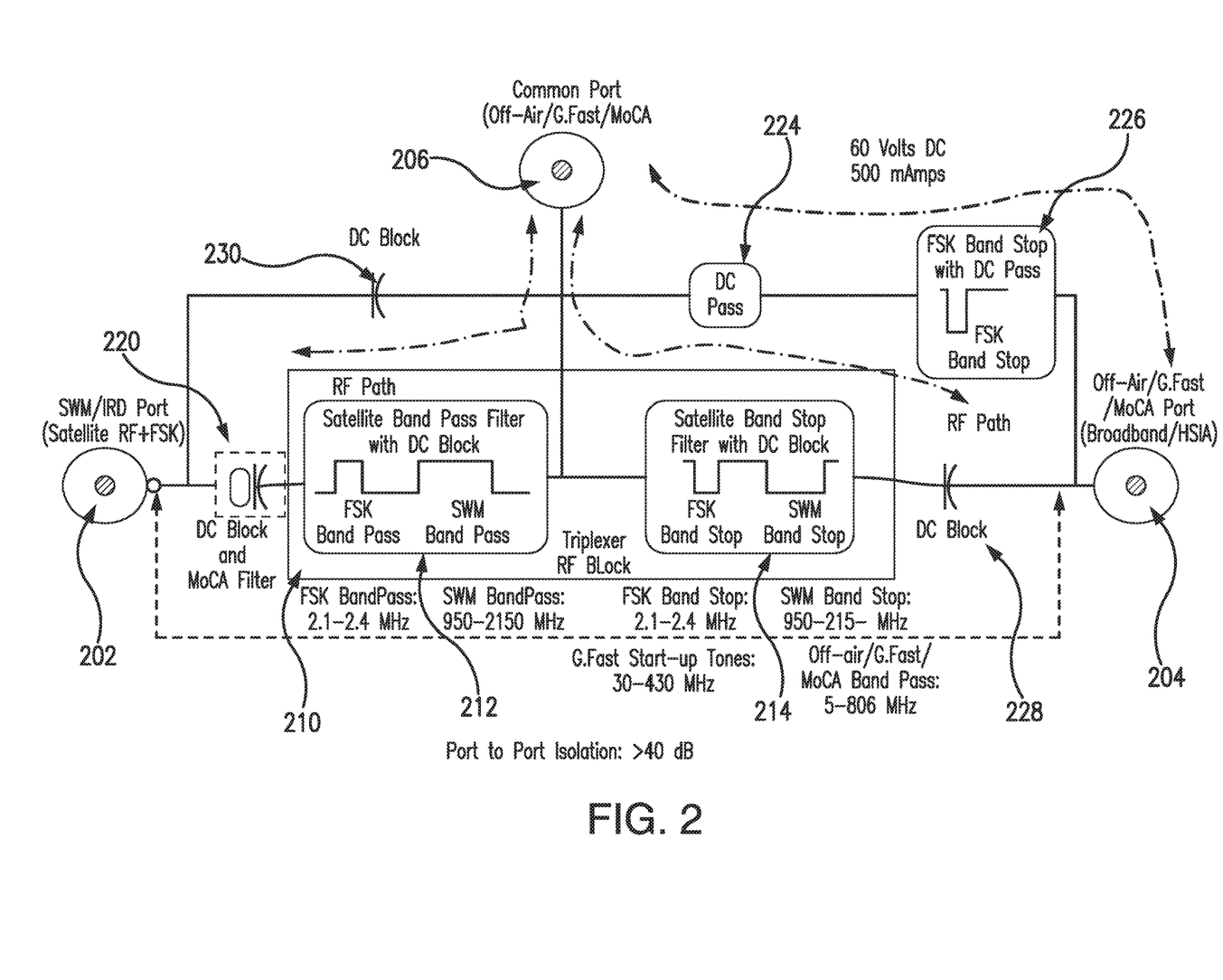
FIG. 2 depicts an illustrative embodiment of triplexer 200.

FIG. 2 depicts an illustrative embodiment of triplexer 200. Exemplary embodiments of triplexer 200 include three ports. One port receives and provides, depending on an orientation of triplexer 200, satellite RF signals at Signal Port 202. A second port receives and provides, depending on an orientation of triplexer 200, high-speed Internet signals at Broadband Port 204. The Broadband Port 204 can also provide a direct current signal. The third port receives and provides, depending on an orientation of triplexer 200, the combined satellite RF signals and high-speed Internet signals at Common Port 206. The Common Port 206 can also provide a direct current signal to and from the Broadband Port 204.

Signal Port 202 enables the satellite RF signal and the SWM FSK RF signal to be injected into the Triplexer 200 and received from the Triplexer 200. Signal Port 202 exemplarily connects to DC Block 220 which provides MoCA RF filtering such that the MoCA frequency band from 400 MHz to 700 MHz is rejected at a level greater than 65 dB. Exemplarily, DC Block 220 blocks DC voltage from passing through the MoCA filtering block. DC Block 230 is exemplarily provided to prevent the DC voltage from passing between Signal Port 202 and Common Port 206.

Signal Port 202 is exemplarily also connected to diplexer 210, which consists of two distinct RF filters, Satellite Band-Pass Filter with DC Block 212 and Satellite Band-Stop Filter with DC Block 214, which in turn perform the RF combining and separation of the respective RF frequencies that are supported, by Signal Port 202 and Broadband Port 204, respectively. Satellite Band-Pass Filter with DC Block 212 performs RF filtering to enable a band pass frequency response for enabling the SWM FSK 2-way communication carrier to operate with less than 3 dB of insertion loss from 2.1 MHz to 2.4 MHz and the Satellite band RF carriers from 950 MHz to 2150 Mhz. Satellite Band-Pass Filter with DC Block 212 also performs image rejection and filtering for all frequencies outside the SWM FSK band and the Satellite band. Diplexer 210 exemplarily provides DC blocking such that no DC voltage can pass from Common Port 206 or Broadband Port 204 to and from Signal Port 202.

Broadband Port 204 enables the UHF-VHF Bands/G.Fast/MoCA/and Cable Modem Frequency bands to be injected into the Triplexer 200 and received from the Triplexer 200. Broadband Port 204 connects to DC Block 228 to provide a DC voltage blocking capability to prevent DC voltage from passing to and from Broadband Port 204 to Signal Port 202. Broadband Port 204 exemplarily connects to Diplexer 210, Satellite Band-Pass Filter with DC Block 212, and Satellite Band-Stop Filter with DC Block 214, which in turn perform the RF combining and separation of the respect RF frequencies that are supported, by Signal Port 202 and Broadband Port 204. Satellite Band-Stop Filter with DC Block 214 exemplarily performs the RF filtering to enable a band-pass frequency response for all frequencies between 30 KHz and 430 KHz as well as 5 MHz to 806 Mhz. Satellite Band-Stop Filter with DC Block 214 also exemplarily performs image rejection and filtering for all frequencies outside the 30 KHz to 430 MHz band and the 5 MHz to 806 MHz band. Broadband Port 204 is also exemplarily connected to FSK Band Stop with DC Pass 226. FSK Band Stop DC Pass exemplarily provides image rejection and filtering for the SWM FSK frequency band between 2.1 MHz and 2.4 Mhz. FSK Band Stop with DC Pass 226 is exemplarily connected in series to DC Pass 224, which exemplarily allows for passing DC voltage and DC current between Broadband Port 204 and Common Port 206.

Figure 3A:
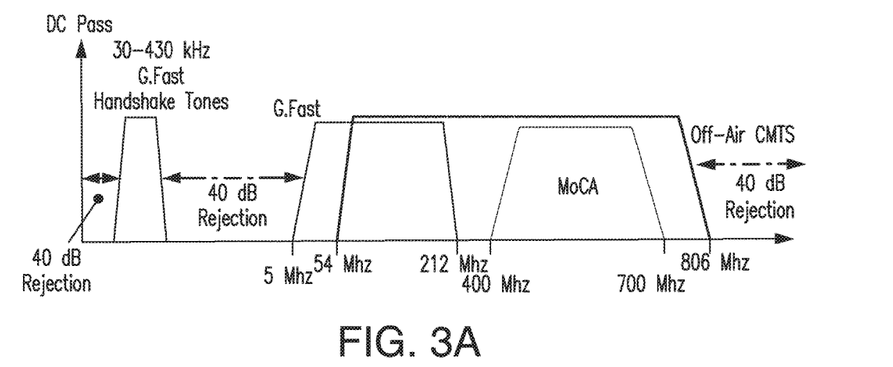
FIGS. 3A, B, C depict an illustrative embodiment of an operation of embodiments of triplexer 200.
Figure 3B:
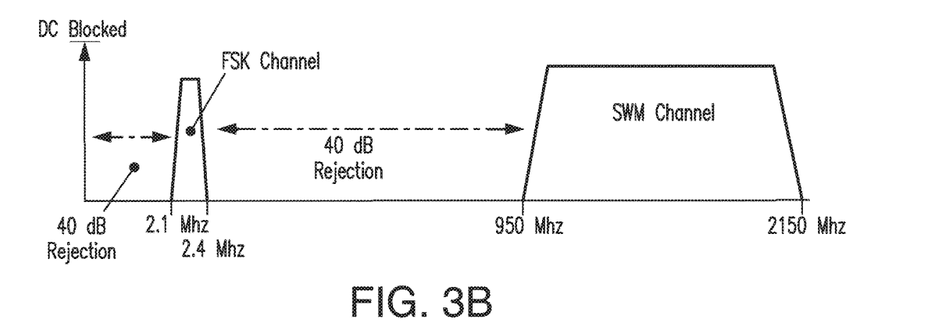
Figure 3C:
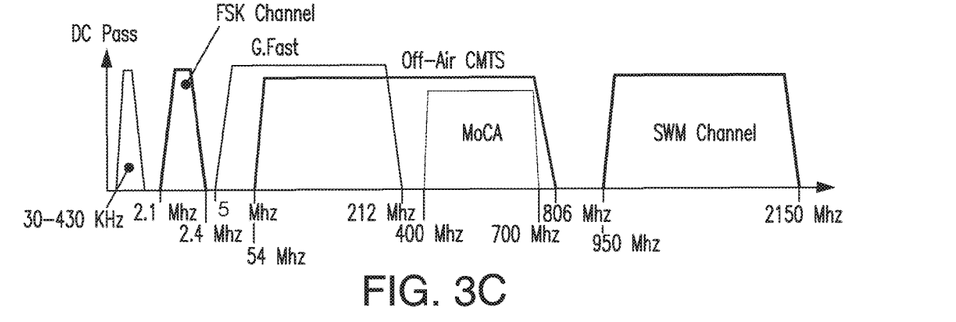

FIGS. 3A-3C describe illustrations of exemplarily filtering performed by the triplexer 200 of FIG. 2. Referring to FIG. 3A, exemplary signals and the filtering that Broadband Port 204 of FIG. 2 may perform is described. Referring to FIG. 3B, exemplary signals and the filtering that Signal Port 202 of FIG. 2 may perform is described. Referring to FIG. 3C, the exemplary signals provided by and filtered by Port 206 of FIG. 2 is described. Exemplary embodiments of the triplexer 200 of FIG. 2 should ensure that "out of band" emissions from each RF service shall not exceed maximum noise ingress thresholds for the desired RF services in their respective operating frequency bands.

In FIG. 3A, Broadband Port 204 can provide exemplary provisions of the G.Fast ITU-T broadband Internet source that requires a maximum ingress noise level not to exceed −155 dBm/Hz from outside sources. Triplexer 200 of FIG. 2 exemplarily provides a minimum of 40 dB of image rejection to prevent outside sources from leaking into the G.Fast frequency band of 5-212 MHz. Exemplarily, very low frequency "Fax" tones used for G.Fast start-up and service handshake in the range of 30 KHz to 430 KHz can be passed. In some embodiments of the triplexer, the signal passing can be configured for a variety of other "non-satellite" services such as Mid-Band RF MoCA, Off-Air UHF/UHV video signals, and Cable Modem Termination Systems (CMTS) to be passed.

Referring to FIG. 3B, exemplary provisions of a satellite RF band requires that no external ingress signal shall exceed −94 dBm/20 MHz (or −167 dBm/Hz). In order to ensure that out of band emissions from adjacent RF services do not interfere with the Satellite band (950-2150 MHz), embodiments of triplexer 200 of FIG. 2 provide a minimum of 40 dB image rejection from any non-satellite RF service such as G.Fast Internet service. Exemplarily, Signal Port 202 enables the satellite RF signal and the SWM FSK RF signal to be injected into the Triplexer 200 and received from the Triplexer 200.

Referring to FIG. 3C, exemplary provisions of the common signal applied to Common Port 206 of FIG. 2 are illustrated. Exemplarily, Triplexer 200 can account for the relative high power levels of the various RF signals. For example, the G.Fast Tx RF power level is nominally 0 to +4 dBm across the 5-212 MHz band. The total aggregate noise power bandwidth of the Satellite RF signal is approx. −10 dBm across the 950 to 2150 MHz band. Exemplarily, Common Port 206 can provide DC reverse voltage line power to enable the MDU or Dwelling unit to power the G.Fast device located in the building data communication closet as illustrated by the DC Pass power in FIGS. 3A and 3C. The reverse line power requirement exemplarily includes support for 60V DC at 500 mAmps. In addition, triplexer 200 complies with all RF requirements over temperature (−32 C to +65 C) and under max voltage and current load.

Thus, Common Port 206 of FIG. 2 as described in FIG. 3C can exemplarily provide service to both a high-speed Internet service, including G.Fast service, in addition to DC voltage to power the device. Common Port 206 can also provide satellite RF signals, or signals from any other RF signal provider, in a predetermined signal frequency range that can provide service from a satellite media content provider.

Figure 4:
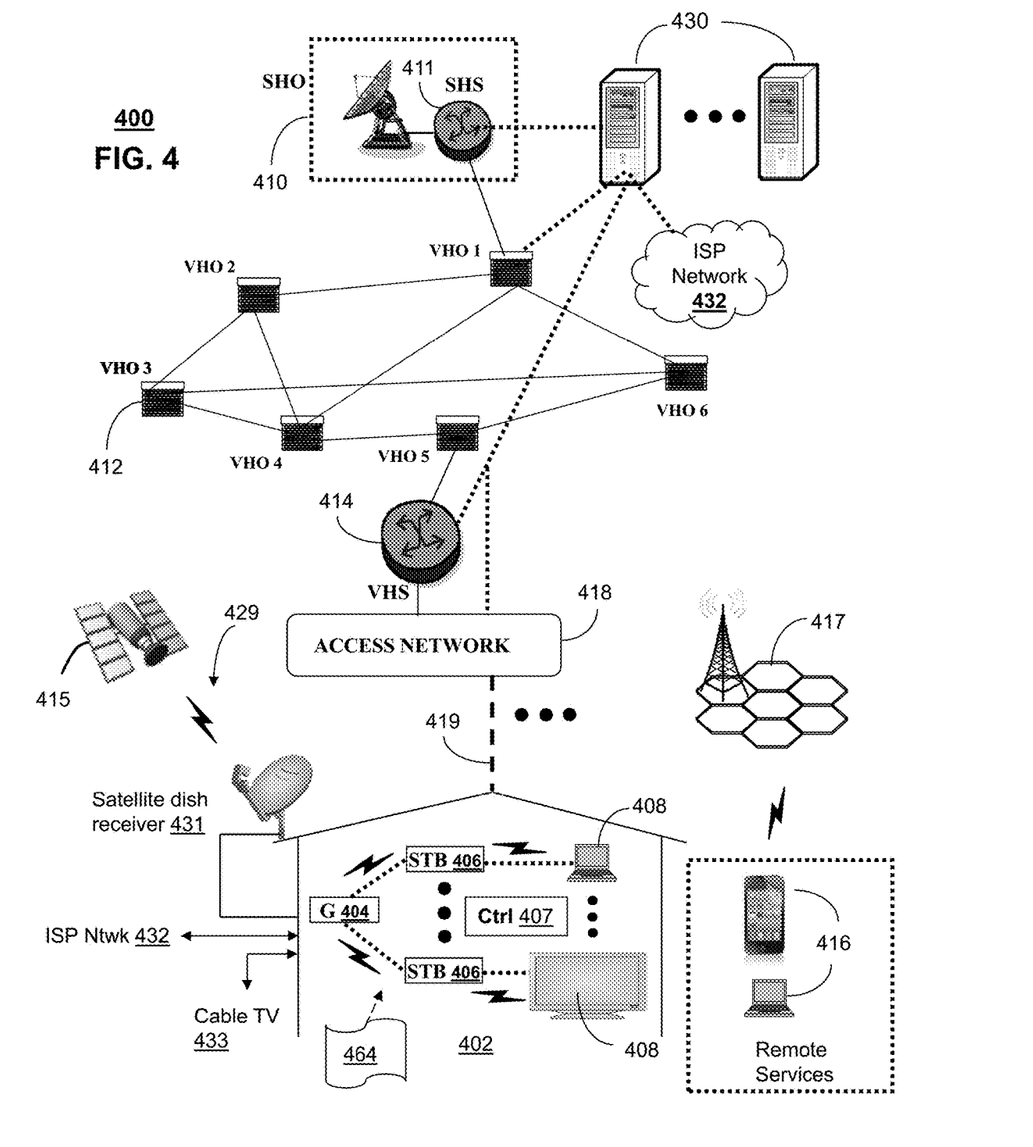
FIG. 4 depict illustrative embodiments of communication systems that provide media services to the environment 100 of FIG. 1.

FIG. 4 depicts an illustrative embodiment of a first communication system 400 for delivering media content. The communication system 400 can represent an Internet Protocol Television (IPTV) media system. Communication system 400 can be overlaid or operably coupled with the triplexer 200 of FIG. 2 as another representative embodiment of communication system 400. For instance, one or more devices illustrated in the communication system 400 of FIG. 4 can communicate with living unit 104 of FIG. 1 through the single coaxial cable input 106 to provide an input of a satellite signal to the set-top box 122.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller). Exemplarily, one or more triplexers 464 can be provided between the satellite dish receiver 431 and access network 419 on one end and the media processors 406 and ISP network 432 or router unit 124 on another end as also exemplarily described above in FIG. 1.

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system. Some of the network elements of the IPTV media system can be coupled to one or more computing devices 430, a portion of which can operate as a web server for providing web portal services over the ISP network 432 to wireline media devices 408 or wireless communication devices 416.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Upon reviewing the aforementioned embodiments, it would be evident to an artisan with ordinary skill in the art that said embodiments can be modified, reduced, or enhanced without departing from the scope of the claims described below. For example, there can be embodiments in which the G.Fast DPU provides power to the router or cable modem. In other embodiments, additional devices in the IDF can be provided with power from the triplexer. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
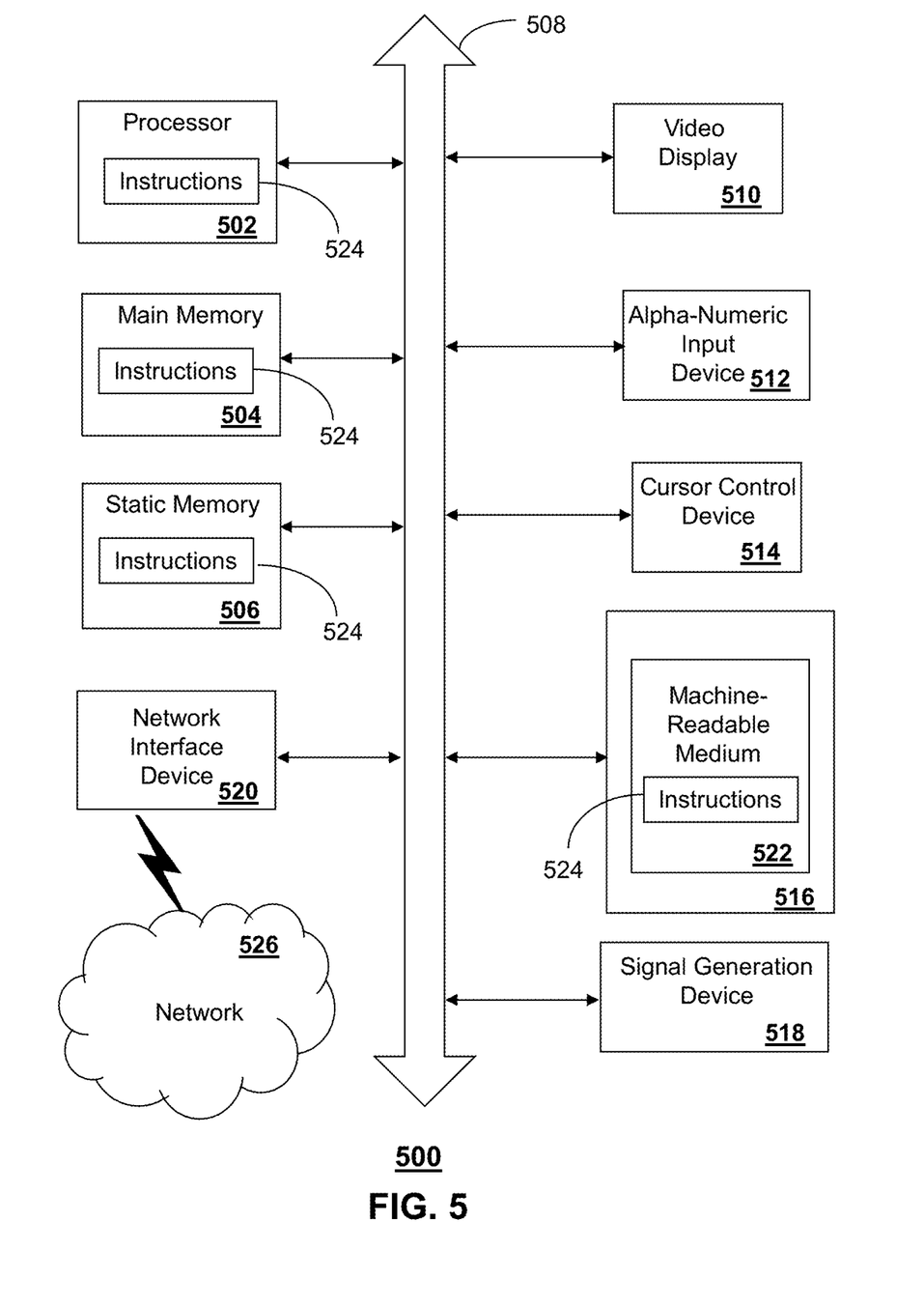
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
a first port that provides a radio frequency signal;
a second port that receives a high-speed Internet connection and the radio frequency signal and provides a power supply current; and
a third port that provides the high-speed Internet connection and receives the power supply current;
a first direct current block; and
a second direct current block;
wherein the first direct current block and the second direct current block are provided in series between the first port and the third port, and
wherein a node between the first direct current block and the second direct current block is connected to the second port.

2. The apparatus of claim 1, wherein the radio frequency signal comprises a satellite radio frequency signal.

3. The apparatus of claim 1, wherein the high-speed Internet connection comprises a G.Fast broadband connection.

4. The apparatus of claim 1, wherein the power supply current comprises a direct current.

5. The apparatus of claim 4, wherein the direct current is approximately 60 volts and 500 milliamps.

6. The apparatus of claim 1, further comprising a direct current pass portion between the second port and the third port.

7. The apparatus of claim 6, wherein the direct current pass portion comprises a frequency shift keying band stop portion.

8. The apparatus of claim 7, wherein the frequency shift keying band is at a frequency of approximately 2.1 MHz to 2.4 MHz.

9. The apparatus of claim 1, further comprising a third direct current block between the first port and the second port.

10. The apparatus of claim 1, wherein the third port provides the high-speed Internet connection to a broadband Internet router.

11. The apparatus of claim 1, further comprising:
a third direct current block between the first port and the first direct current block; and
a fourth direct current block between the third port and the second direct current block.

12. The apparatus of claim 1, wherein the first direct current block comprises:
a frequency shift keying band pass portion; and
a radio frequency band pass portion.

13. The apparatus of claim 1, wherein the second direct current block comprises:
a frequency shift keying band stop portion; and
a radio frequency band stop portion.

14. A system, comprising:
a conductor coupled to a single living unit premise;
a triplexer configured to receive a satellite radio frequency signal and a broadband Internet connection from a multi-premise intermediate distribution frame via the conductor; and
the triplexer comprises:
a first port that provides the satellite radio frequency signal to a media processor of the single living unit premise;
a second port that provides the broadband Internet connection to an Internet device of the single living unit premise and receives a direct current power supply signal;
a third port that receives the satellite radio frequency signal and the broadband Internet connection via the conductor and provides the direct current power supply signal to the multi-premise intermediate distribution frame via the conductor;
a first direct current block; and
a second direct current block,
wherein the first direct current block and the second direct current block are provided in series between the first port and the second port, and
wherein a node between the first direct current block and the second direct current block is connected to the third port.

15. The system of claim 14, wherein the media processor includes a set-top box portion and a digital video recorder portion.

16. The system of claim 14, wherein the triplexer further comprises:

a third direct current block between the first port and the first direct current block; and a fourth direct current block between the second port and the second direct current block.

17. A system, comprising:

a multi-premise intermediate distribution frame comprising a satellite signal receiver that provides a satellite radio frequency signal and a broadband Internet device that provides an Internet connection;

an intermediate distribution frame triplexer that comprises a first port, a second port, a third port, a first direct current block, and a second direct current block;

the intermediate distribution frame triplexer is configured to receive the satellite radio frequency signal from the multi-premise intermediate distribution frame via the first port and the Internet connection from the multi-premise intermediate distribution frame via the second port;

the intermediate distribution frame triplexer is configured to provide a direct current power supply signal to the broadband Internet device via the second port;

the intermediate distribution frame triplexer is configured to combine the satellite radio frequency signal and the Internet connection into a coaxial cable signal for transmission on a coaxial cable connected to the third port of the intermediate distribution frame triplexer while receiving the direct current power supply signal at the third port via the coaxial cable;

the first direct current block and the second direct current block are arranged in series between the first port and the second port; and a node between the first direct current block and the second direct current block is connected to the third port.

18. The system of claim 17, wherein the third port provides the satellite radio frequency signal and the Internet connection to an individual living unit and receives the direct current power supply signal from the individual living unit via the coaxial cable.

19. The system of claim 17, further comprising an individual living unit triplexer located in an individual living unit, wherein the individual living unit triplexer is connected to an individual living unit coaxial cable outlet, and wherein the individual living unit triplexer comprises:

a fourth port that receives the satellite radio frequency signal and the Internet connection from the coaxial cable and provides the direct current power supply signal to the individual living unit coaxial cable outlet, wherein the fourth port is isolated from the direct current power supply signal;

a fifth port that receives the direct current power supply signal from a broadband Internet router in the individual living unit and provides the Internet connection to the broadband Internet router; and a sixth port that provides the satellite radio frequency signal to a media processor in the individual living unit.

20. The system of claim 17, wherein the broadband Internet device comprises a G.Fast distribution point unit, and wherein the G.Fast distribution point unit is powered by the direct current power supply signal.

* * * * *